Figure 1:
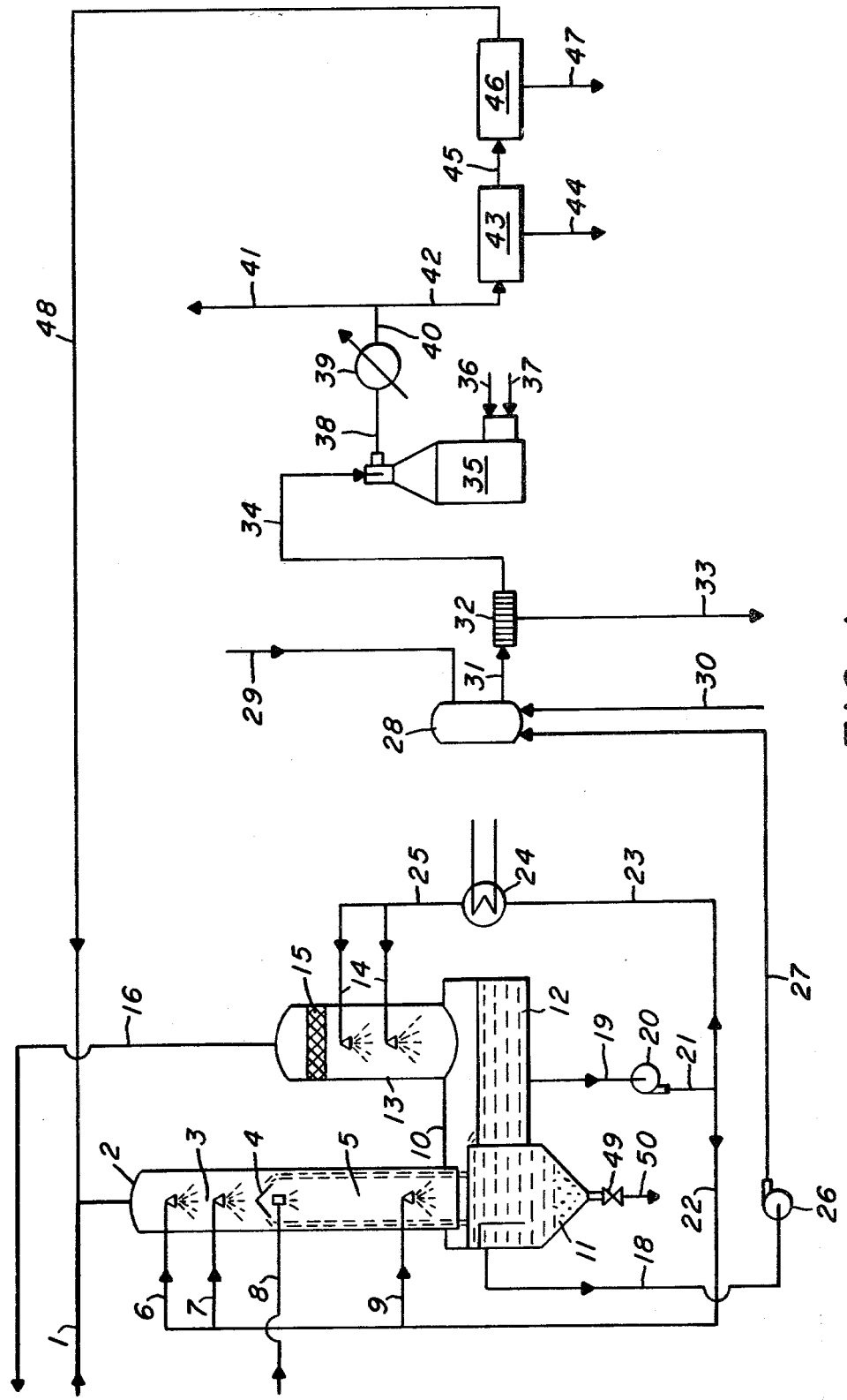

United States Patent [19]

Haese et al.

[11] 4,213,945
[45] Jul. 22, 1980

[54] PROCESS AND APPARATUS TO PURIFY WASTE INDUSTRIAL GASES

[75] Inventors: Egon Haese, Bochum; Hans Moll, Marl; Rolf Willms, Bochum, all of Fed. Rep. of Germany

[73] Assignee: Dr. C. Otto & Comp. G.m.b.H., Bochum, Fed. Rep. of Germany

[21] Appl. No.: 889,707

[22] Filed: Mar. 24, 1978

[30] Foreign Application Priority Data

Mar. 2, 1977 [DE] Fed. Rep. of Germany ....... 2708919

[51] Int. Cl.² ............................................. B01D 53/34
[52] U.S. Cl. ..................... 423/240; 423/235; 423/242; 423/465; 423/481; 423/497; 423/541 A; 423/545; 423/554; 423/563; 423/574 R; 423/638
[58] Field of Search ............... 423/240, 235, 242 D, 423/573 R, 573.6, 574 R, 574 L, 545, 547, 541 A, 563, 465, 554, 497, 638, 481

[56] References Cited

U.S. PATENT DOCUMENTS

| | | | |
|---|---|---|---|
| 1,989,124 | 1/1935 | Westbrook | 423/545 |
| 3,031,262 | 4/1962 | Rosenbloom | 423/242 A |
| 3,795,731 | 3/1974 | Furkert | 423/541 A |
| 3,957,951 | 5/1976 | Hokanson et al. | 423/242 A |
| 3,991,047 | 11/1976 | Moudry et al. | 423/357 X |

*Primary Examiner*—Earl C. Thomas
*Attorney, Agent, or Firm*—Thomas H. Murray; Clifford A. Poff

[57] ABSTRACT

Industrial waste gases containing sulfur dioxide, hydrogen fluoride, hydrochloric acid and sulfur trioxide are treated within a reaction tank in a first stage with a solution containing ammonium ions to increase the dew point of the gases. The gases are then cooled below the elevated dew point in a second stage below which a deflector system directs the gases along the wall of the reaction tank into a third stage where the gases are cooled by a spray mist of an ammonia mixture to form ammonium salts. The gases are then treated in a fourth stage at the bottom of the reaction tank with the solution containing ammonium ions to precipitate ammonium salts into a reservoir below the reaction tank. Purified waste gases are discharged into a cooler where a stripper removes entrained droplets of liquid before discharge into the atmosphere. The droplet size of the solution sprayed into the second stage is larger than the droplet size of the solution sprayed into the first stage. The solution sprayed into the reaction tank as well as the cooler has a concentration below its saturation limit and the gases are cooled to a temperature which is 0.1° C. to 3° C. below the dew point temperature. The dew point of the cooled gases in the second stage is below the temperature of the gases and sensible heat withdrawn from the gases at this stage is recovered. The precipitated ammonium salt solution in the reservoir contains ammonium ions and a partial flow of this solution is treated according to different embodiments of the processes.

17 Claims, 2 Drawing Figures

PROCESS AND APPARATUS TO PURIFY WASTE INDUSTRIAL GASES

BACKGROUND OF THE INVENTION

This invention relates to a process and apparatus for the purification of industrial waste gases arising out of, for example, sintering processes, incineration of refuse, fossil substances and the like wherein such gases contain, in addition to fly ash, gaseous constituents which pollute the atmosphere. More particularly, the gaseous constituents of the waste gases include sulfur dioxide and sulfur trioxide as well as hydrogen fluoride, hydrogen chloride and nitrogen oxides.

Heretofore, wet processes were employed for the purification of such forms of industrial waste gases. However, the known forms of wet processes have the disadvantage that problems of environmental pollution are transformed from a gaseous state to a water state. The environmental problems which occur are particularly related to disposal problems which are difficult to solve, i.e., the disposal of thixotropic sludges or the disposal of salt solutions which produce the salting of water.

Under these conditions, it is obvious to employ only dry purification processes which do not give rise to water polluting problems as well as other dumping problems. An attempt has already been made in the art to use dry processes for the removal of sulfur dioxide and sulfur trioxide by the addition of ammonia. In British Patent No. 826,221, there is disclosed a process for the removal of sulfur dioxide from waste gases by means of gaseous ammonia wherein the reaction process is carried out above the gas dew point. A dry salt mixture is obtained which contains sulfite, hydrogen sulfite, sulfate and hydrogen sulfate. The dry salts are separated by means of electrostatic precipitators or cyclones. After the resulting salt mixture is dissolved, the solids are removed and the mixture is treated with sulfuric acid to produce sulfate with the sulfur dioxide being split off. The object of this process is the recovery of ammonium sulfate.

The reaction of sulfur dioxide with ammonia in damp air at room temperature on a laboratory scale is reported in pages 67–72 of the journal entitled "Ind. Eng. Chem. Fundam.", Vol. 14, No. 1 (1975). It is shown that the oxidation of sulfur dioxide to form sulfur in sulfate form under the laboratory scale conditions is influenced apart from oxygen, solely by the water vapor content of the gas mixture. The author of this article confines himself to room temperature conditions and points out that his findings do not apply to conditions applicable to industrial waste gas purification for which no conclusions can be drawn from the results given. It is apparent from the prior publications that it is extremely difficult to obtain complete oxidation of sulfur dioxide to give sulfate sulfur at the relatively high temperatures applicable in dry waste gas purification.

The Journal of the Institute of Fuel, September 1956, pages 372–380, for example, describes that sulfur trioxide reacts with ammonia selectively to form sulfate at elevated temperatures (150° C.–650° C.) and in the presence of water vapor. Under these conditions, no reaction between sulfur dioxide and ammonia takes place whereby the sulfur dioxide could be separated. It is considered necessary that oxidation of sulfur dioxide be carried out beforehand. In U.S. Pat. No. 2,912,304, there is described an oxidation process wherein solid ammonium sulfate is prepared from gases containing sulfur dioxide by adjusting the stoichiometric gas mixture of sulfur dioxide, ammonia, water and $NO_x$ at temperatures above 200° C. in a fluidized catalyst bed wherein vanadium pentoxide is used as a catalyst. The disadvantage of this process is that the particles of catalyst are inactivated because the particles become caked with ammonium sulfate. Expensive regeneration of the catalyst must be carried out. The problem of caking in pipelines and apparatus also occurs with other processes described above which require expensive purification systems.

In West German Patent No. 2,431,130, the object of the disclosure is to produce dry ammonium sulfate from the sulfur dioxide and sulfur trioxide content in the waste gas. The dry salt is obtained by injecting a saturated solution of ammonium sulfate into the flow of hot waste gas and then passing the mixture through an electrostatic precipitator at a downstream location. The amount of heat withdrawn from the waste gas is relatively low, so that in this process, the temperature of the gas remains far above the dew point of the gas. The salt solution to be vaporized is produced in this process by bringing the gas into contact with a circulating solution in a downstream wet scrubber. The circulating solution contains a cation, e.g., ammonia, which absorbs sulfur dioxide. The reaction takes place relatively slowly at the interface of the liquid film and, therefore, internal members in the column, such as Raschig rings, are required to promote the mass and heat transfer. Cooling of the gas in this process occurs by yielding sensible heat from the gas for concentration of the circulating solution. The considerable loss of heat must be made up by the use of expensive completely desalinated water, as is apparent from the specification. Another disadvantage of supplying fresh water into the top of the column is that the gas flow from the column is at dew point temperature while charged with the additionally-evaporated water. A further disadvantage is that the circulating solution consists of a mixture of sulfate and sulfite which, before evaporation, must be oxidized with air or with ozone-enriched air.

The ammonium sulfate obtained from this process can be used without processing in expensive purification plants only when the fly ash content of the treated waste gas is very low and if the waste gas contains no harmful constitutents to the environment. This known process is unusable for waste gases containing other constituents harmful to the environment, e.g., hydrogen chloride, hydrogen fluoride and the like.

West German Patent No. 2,518,386 discloses an improvement to the above-described process, wherein ammonia is fed to the flue gas before or immediately after mixing with the concentrated salt solution. This is described to have the advantage that the dew point temperature of the sulfuric acid is so lowered as to be far below the gas temperature. This does not eliminate the above disadvantages.

A sulfur dioxide absorbing cation is again formed in the bottom part of the wet scrubber by the circulating solution. The water losses must be made up by a completely desalinated supply of fresh water. In addition, ammonium sulfate production is no longer economic because ammonium sulfate can be used profitably only with difficulty. Moreover, ammonium nitrate is preferred to ammonium sulfate for fertilizing purposes. The ammonia sulfate salt cannot be discharged into rivers because the quantity of salt and nutrient in the water would be increased with polluting effect. No comprehensive solution has heretofore been disclosed in the art to provide for the separation and utilization of by-products from waste gas processing which is both compatible with the environment and yet economic.

This applies particularly to the case in which harmful constituents, such as hydrogen chloride, hydrogen fluoride and nitrogen oxides are to be removed from waste gases at the same time as sulfur dioxide and sulfur trioxide are removed from the gases. This is the object of the invention.

SUMMARY OF THE INVENTION

It is an object of the present invention to provide a process and apparatus for the purification of industrial waste gases containing sulfur dioxide, together with other harmful gas constituents, such as hydrogen fluoride, hydrochloric acid, sulfur trioxide and nitric oxides ($NO_x$) by treating the flow of raw waste gases with solutions containing ammonium ions and ammonia.

Industrial waste gases containing sulfur dioxide together with other polluting constituent gases such as hydrogen fluoride, hydrochloric acid and sulfur trioxide are purified according to the present invention by a process which includes the steps of increasing the dew point of industrial waste gases as a first stage within a reaction tank by the partial evaporation therewith of a solution containing ammonium ions, cooling the gases below the elevated dew point as a second stage in the reaction tank, treating the cooled gases with a mist of an ammonia mixture as a third stage in the reaction tank to form ammonium salts from the treated gases, delivering the treated gases as a fourth stage into the bottom of the reaction tank to precipitate the ammonium salts therefrom by treatment with a solution containing ammonium ions, feeding the precipitated ammonium salts into a reservoir, and feeding the purified waste gases from the reaction tank through a cooler for discharge into the atmosphere.

The present invention further provides an apparatus to purify industrial waste gases containing sulfur dioxide together with other polluting gas constituents such as hydrogen fluoride, hydrochloric acid and sulfur trioxide, the apparatus including the combination of a reaction tank having defined therein successively-arranged chambers for treating the industrial waste gases for purification thereof, means to conduct the industrial waste gases into the upper treatment chamber within said reaction tank, a roof-shaped deflector within the middle portion of the reaction tank separating the upper treatment chamber from an underlying lower treatment chamber, the roof-shaped deflector directing the industrial waste gases from the upper treatment chamber onto the inside wall of the reaction chamber while the gases pass beyond the deflector into the lower treatment chamber, supply means including a nozzle below the roof-shaped deflector to spray gases in the lower treatment chamber with ammonia, and a reservoir coupled to the bottom of the reaction tank to collect precipitate from the industrial waste gases passing into the reservoir from the reaction tank.

Thus, according to the present invention the flow of raw waste gases is treated in a reaction tank in a number of successive stages, a solution which contains ammonium ions is introduced into a first stage to raise the gas dew point of the waste gases by partial evaporation of such solution, the waste gases are then cooled below the dew point in the second stage, ammonia is introduced into the resulting gas mist mixture in the third stage, and the resulting ammonium salts are precipitated in the bottom part of the reaction tank in a fourth stage by treatment with a solution containing ammonium ions. The precipitate is fed to a reservoir, while the purified gases pass through a cooler where the waste gases are cooled preferably with the cooled solution containing the precipitated ammonium salts. The cooled waste gases are then discharged into a chimney.

According to the invention, the solution containing the precipitated ammonium salts is used for treatment of the gases in the first, second and fourth stages. Advantageously, the droplet size of the solution sprayed into the second stage is larger than the droplet size of the solution sprayed into the first stage.

In a preferred embodiment of the invention, the solution used to spray the gases in the reaction tank and in the cooler has a concentration just below the saturation limit; and the treated gases are cooled to a temperature between 0.1° C. to 3.0° C., preferably 0.5° C. to 1.0° C. below the dew point temperature.

Also, according to the invention, the dew point of the gases discharged from the cooling stage in the reaction tank is below the temperature of the gases, and the sensible heat withdrawn from the gases in the cooling stage is recovered.

With the processes disclosed heretofore, it is not possible to completely oxidize sulfur dioxide to sulfate sulfur under the conditions for purification of industrial waste gases at elevated temperatures and separate sulfate sulfur quantitatively by means of ammonia. On the contrary, it was necessary either to use an external oxidation catalyst, e.g., vanadium pentoxide, or other expensive post-oxidation devices in order to produce ammonium sulfate quantitatively.

Surprisingly, it has been discovered that when, in accordance with the present invention, processing of the waste gases is carried out at temperatures, above room temperature, at the dew point or at an operation point determined from the fact that the gases at dew point temperature yield a mist by slight cooling, the ammonia supplied together with oxygen and/or $NO_x$ converts the sulfur dioxide contained in the waste gases quantitatively to sulfate sulfur. This eliminates the additional use of an external oxidation catalyst and post-oxidation equipment. Another advantage of the present invention is that cooling of the treated waste gases with circulating, substantially saturated ammonium sulfate solution causes the treated gas to leave the cooling stage in the dry state so that expensive reheating is obviated.

Further features of the invention provide for the processing of a subflow of the solution containing the precipitated ammonium salts which is not returned directly to the process.

Figure 2:
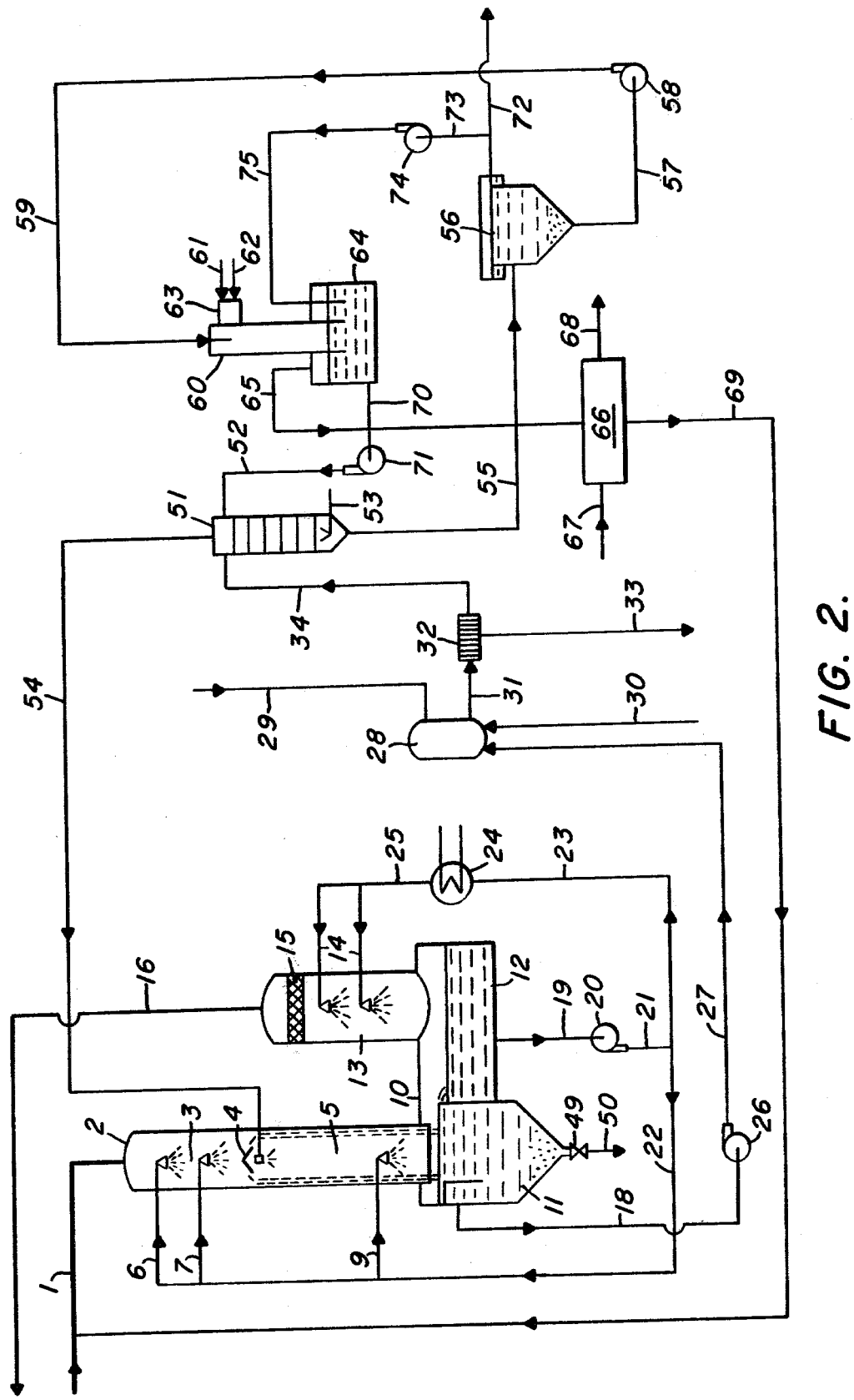

These features and advantages of the present invention as well as others will be more fully understood when the following description is read in light of the accompanying drawings, in which:

FIG. 1 diagrammatically illustrates one embodiment of a system and apparatus according to the present invention; and FIG. 2 diagrammatically illustrates a second embodiment of the present invention wherein ammonia is recycled in the process.

The embodiment of the present invention illustrated schematically in FIG. 1 utilizes a supply of ammonia from some other production process and not intended to recycle the ammonia. A supply of ammonia suitable for this process usually originates from the distillation gases of coke plants. Coke plants very frequently are designed to cooperate with coal-fired power stations or foundries which discharge waste gases containing acid components. The discharge of waste gases by foundries from sintering processes is a particularly acute environmental pollution problem.

In the embodiments of the present invention shown schematically in FIGS. 1 and 2, the waste gases for treatment are conducted by a pipe 1 into the top of a reaction tank in the form of a reaction column 2. The gases are brought into contact in a cooling zone 3 with a finely-atomized ammonium sulfate solution supplied by pipe 6. Cooling of the gases in cooling zone 3, in the uppermost part of column 2, is carried out to the dew point. Water from the sprayed solution passes to the gases so that the dew point of the gases is raised. Pipe 7 supplies ammonium sulfate solution which is sprayed into the column at the bottom end of the cooling zone 3. Since the temperature of the ammonium sulfate solution is less than the temperature of the previously saturated gases, there is a partial recondensation of the previously evaporated water. As the mixture moves jointly downward, the gases and the salt solution encounter a deflector system 4 which separates the top cooling zone 3 from an actual reaction chamber 5. The deflector system deflects the liquid to the inside wall of the reaction column 2, while the gases containing fine mist droplets pass into contact with ammonia which is introduced by pipe 8. Since the gases inside the reaction chamber remains constantly in contact with a colder flow of liquid running down the inside wall of the column, there is a continuous disturbance to equilibrium so that the mists are stabilized. In the reaction chamber, the sulfur dioxide content of the gases reacts to form ammonium sulfate. At the same time, hydrogen fluoride, hydrogen chloride and sulfur trioxide components of the gases are fixed to the ammonia. At the end of the reaction chamber, the treated gases are again sprinkled with a salt solution of ammonium sulfate conducted by pipe 9 so that the formed salts are separated.

The gases then flow in the reservoir 10 which consists of chambers 11 and 12, and then to the cooling tower 13. In the cooling tower, the gases are brought into contact with the cold salt solution from reservoir 12 supplied by pipes 14. Stripper 15 in the upper part of cooling tower 13 removes droplets of liquid entrained in the gases. The liquid droplets are returned to the cooler; while the gases from the harmful substances have been removed are discharged to a chimney by pipe 16. The temperature of the salt solution used for cooling is so controlled that the water vapor originally contained in the untreated gases is discharged again with the flow of waste gases.

The advantage of cooling the gases with an almost saturated salt solution from the reservoir 12 is that the vapor point of water above this solution is less than the vapor point of pure water. In this way, it is possible to obtain a gas having a temperature that is 5° to 8° above the water vapor dew point.

The concentrated salt solution obtained then flows into chamber 11 of reservoir 10. Solid deposits are withdrawn from the bottom of reservoir 10 through valve 49 by pipe 50, while a subflow of the salt solution is discharged from chamber 11 by pipe 18.

An overflow of concentrated salt solution from chamber 11 flows into the chamber 12 of the reservoir, where it mixes with the recondensed water. The solution is withdrawn by pipe 19 from chamber 12 and returned by pump 20 through pipes 21 and 22 into the reaction column through pipes 6, 7 and 9. A subflow of the solution flows through pipes 21 and 23 to heat exchanger 24 and then by pipes 25 and 14 into the cooling tower 13.

The heat exchanger 24 serves for recovery of the sensible heat from the flow of gases undergoing purification. Dissipation of heat at this point in the process offers decisive advantages, even though the temperature level is low, because the temperature of the salt solution used for treating the gases is approximately at the dew point temperature of the gases. The reason for this is that the favorable heat transfer coefficients of the liquid phase give exchange surfaces which represent a fraction of the exchange surfaces required for indirect cooling of the incoming flow of gases to dew point temperature.

The salt solution withdrawn from chamber 11 is conducted by pipe 18 to pump 26 and delivered by pipe 27 to a reaction tank 28 in which the fluorine compounds withdrawn from the gases react to give insoluble cryolite, e.g., by the addition of aluminum salts introduced by a pipe 29 into the reaction tank. The reaction can be accelerated by increasing the pH value. To this end, ammonia can be introduced into the reaction tank 28 by pipe 30. Of course, any other known method of removing the fluorine compounds can be used.

The salt solution is then fed from the reaction tank 28 by pipe 31 to a filter 32 in which the water-insoluble cryolite is separated and discharged by pipe 33.

The foregoing description of the present invention thus far applies equally to the processes illustrated in FIGS. 1 and 2.

In the embodiment of the process shown schematically in FIG. 1, the salt solution from which hydrogen fluoride has been removed is fed via pipe 34 to a combustion device 35 in which the salt solution is burned at a temperature of about 1000° C. with the addition of fuel gas and air fed into the combustion device by pipes 36 and 37, respectively. During combustion, ammonia is completely converted to nitrogen and water vapor. The combustion process is controlled so that the sulfur content of the salt solution is obtained either as a mixture of hydrogen sulfide and sulfur dioxide or, in the case of totally reducing conditions by the combustion process, in the form of just hydrogen sulfide.

In the latter case, only hydrogen sulfide is obtained and the waste combustion gas is fed by pipe 38 through heat recovery device 39 from which pipes 40 and 41 deliver the waste combustion gases to any gas flow requiring purification, e.g., a coke oven gas from which the hydrogen sulfide is to be removed. Alternatively, a separate hydrogen sulfide wash can be provided, the sulfur being obtained, for example, by the process of oxidation.

Combustion may alternatively be so controlled that only partial reduction of the sulfur dioxide takes place to give a hydrogen sulfide-sulfur dioxide mixture with a ratio of $H_2S:SO_2$ of 2:1 or 1.9:1. The resulting gas mixture is then fed by pipe 42 into a Claus plant 43 wherein hydrogen sulfide and sulfur dioxide are converted to elementary sulfur. The resulting sulfur is fed to the place of use by pipe 44. It is advantageous to make the $H_2S/SO_2$ ratio less than 2:1 because the hydrogen sulfide conversion is complete and the combustion waste gas contains practically only $SO_2$ as an acid constituent.

With a two-stage reaction, there is an 80% to 85% conversion of hydrogen sulfide and sulfur dioxide to elementary sulfur.

The waste gas is discharged from the Claus plant at a temperature of about 150° C. through pipe 45 to a device 46 for recovery of the chloride from the gases. The present invention proposes the employment of a water wash in device 46 whereby hydrogen chloride is absorbed by the water and discharged by pipe 47, while the waste gas with the sulfur dioxide not separated in the Claus plant flows back through pipe 48 into the flow of waste gases for treatment by discharge into the reaction column through pipe 1.

In the embodiment of the present invention according to FIG. 2, removal of acid components from the flow of gases undergoing treatment again takes place by employing ammonia, which is recovered and recycled. Recovery of the ammonia is effected by substitution by means of an alkaline earth solution, which is subjected to a regeneration process to avoid dumping.

The solution from which the fluorine compounds have been removed flows through pipe 34 into the top of a stripper column 51. A solution containing calcium hydroxide is fed by pipe 52 into the top of the stripper column 51. In the stripper column, the ammonia is already substituted in the solution by the calcium and the solution, now containing free ammonia, passes through the stripper column in the downward direction, the column being provided with exchange elements. To assist stripping, water vapor or a gas suitable for stripping ammonia is introduced to the bottom of the column by pipe 53. The stripped ammonia leaves the top of the column through pipe 54 and returned to the reaction column 2.

The water containing the corresponding calcium compounds is fed by pipe 55 to a separating tank 56 producing deposits of sludge, e.g., calcium sulfate. The sludge deposit in pumpable form is withdrawn by pipe 57 from the separating tank 56 by pump 58 through pipe 59 into a combustion chamber 60. The sludge is burned in the combustion chamber with the addition of fuel gas and air fed by pipes 61 and 62, respectively, into burner 63.

In the processing of the sulfuric acid compounds, the reaction temperature in the combustion chamber is between 800° C. to 1200° C., preferably between 900° C. to 1000° C. The reaction gases are fed into immersion chamber 64 and quenched. The combustion process in combustion chamber 60 takes place under reducing conditions so that the vapors discharged by pipe 65 and containing hydrogen sulfide can be fed to a Claus plant 66 in which elementary sulfur is produced by the addition of air fed to the plant by pipe 67. The elementary sulfur is fed to its place of use by pipe 68. The sulfur dioxide containing reaction waste gases from the Claus plant is recycled by pipe 69 to the flow of waste industrial gases for treatment in the reaction column by pipe 1.

During combustion of the calcium sulfate sludge in the combustion chamber 60, calcium oxide is formed which is again converted to active calcium hydroxide upon quenching in the immersion chamber 64. This solution is returned to the top of the column 51 through pipe 70 by pump 71 and pipe 52. The clear fluid containing the calcium chloride runs from the top of the separating tank 56 by pipe 72, while a subflow is recycled to the immersion chamber 64 by pipe 73, pump 74 and pipe 75 to maintain the water economy.

If the discharge of calcium chloride solution is not permitted then, according to the present invention, the calcium chloride solution is gasified with $CO_2$ to give calcium carbonate. Water solubility is difficult. Calcium carbonate can be introduced into the combustion chamber by pipe 59 together with the pumpable sludge, while the liberated hydrogen chloride is obtained as hydrochloric acid as described heretofore in connection with FIG. 1.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A process to purify industrial waste gases containing sulfur dioxide together with other polluting constituent gases selected from the group consisting of hydrogen fluoride, hydrochloric acid and sulfur trioxide, said process including the steps of:

increasing the dew point of industrial waste gases as a first stage within a reaction tank by the partial evaporation therewith of a solution of ammonium sulfate containing ammonium ions, cooling the gases below the elevated dew point with a solution of ammonium sulfate as a second stage in the reaction tank, supplying oxygen and/or $NO_x$ into said reaction tank and treating the cooled gases with an ammonia mist as a third stage in the reaction tank to form ammonium salts from the polluting constituent gaseous content of the treated gases, delivering the treated gases as a fourth stage into the bottom of the reaction tank to precipitate the ammonium salts therefrom by treatment of the polluting constituent gaseous content with a solution of ammonium sulfate containing ammonium ions, collecting the precipitated ammonium salts below said fourth stage in a reservoir, and feeding the purified waste gases from the reaction tank through a cooler for discharge into the atmosphere.

2. The process according to claim 1 including the further step of cooling the purified waste gases from the reaction tank in a cooler with a cooled solution containing precipitated ammonium salts.

3. The process according to claim 1 wherein said gases are treated with a solution containing precipitated ammonium salts during said first, second and fourth stages.

4. The process according to claim 1 wherein said step of increasing the dew point includes spraying a solution containing ammonium ions during said first stage, the droplet size of the sprayed solution used in the first stage being smaller than the droplet size of a solution sprayed into the gases during said second stage for said step of cooling the gases below the elevated dew point.

5. The process according to claim 2 wherein a solution having a concentration just below the saturation limit is used to spray gases in the reaction tank and for said step of cooling the purified waste gases.

6. The process according to claim 1 wherein said step of cooling the gases includes reducing the temperature of the gases to between 0.1° C. and 3° C. below the dew point temperature.

7. The process according to claim 1 wherein said step of cooling the gases includes reducing the temperature of the gases to between 0.15° C. and 1.0° C. below the dew point temperature.

8. The process according to claim 1 wherein the dew point temperature of the gases after said step of cooling is below the temperature of the gases.

9. The process according to claim 1 including the further step of recovering sensible heat withdrawn from the gases by said step of cooling the gases below the elevated dew point.

10. The process according to claim 1 including the further step of withdrawing from said reservoir a partial flow of precipitated solution containing ammonium ions, separating fluoride from the partial flow of precipitated solution, and burning the defluorinated precipitated solution at a temperature of about 1000° C. with the addition of fuel gas and air.

11. The process according to claim 10 wherein said step of burning includes metering the supply of air to maintain combustion under partial reducing conditions to obtain a 2:1 ratio of hydrogen sulfide to sulfur dioxide and wherein the process includes the further steps of feeding waste gases from said step of burning into a Claus plant to recover sulfur, washing hydrogen chloride from the waste gases from the Claus plant, and feeding the washed waste gases into the first stage of said reaction tank for said step of increasing the dew point.

12. The process according to claim 10 wherein said step of metering includes metering the supply of air to maintain combustion under total reducing conditions to form hydrogen sulfide, recovering sensible heat from the waste gases of the combustion process and purifying the resulting gases after the recovery of sensible heat therefrom.

13. The process according to claim 1 including the further steps of withdrawing precipitated solution containing ammonium ions from said reservoir, separating fluoride out of the withdrawn precipitated solution, feeding the withdrawn precipitated solution after separation of fluoride therefrom into a stripper column, using milk of lime to strip ammonia from the precipitated solution within the stripper column, withdrawing the bottom product including lime sludge from the stripper column, separating the withdrawn bottom product into liquid and sludge including pumpable sludge, burning the pumpable sludge under reducing conditions at a temperature between 600° C. and 1200° C. within a combustion chamber while adding fuel gas and air into the combustion chamber to yield combustion products including calcium oxide, treating said combustion products with an aqueous liquid in an immersion chamber to convert the calcium oxide in the combustion products to calcium hydroxide and yield vapors containing hydrogen sulfide, feeding the vapors containing hydrogen sulfide into a Claus plant, treating the vapors containing hydrogen sulfide with air in the Claus plant to obtain elementary sulfur and waste reaction gases containing sulfur dioxide, recovering elementary sulfur from the Claus plant, and feeding said waste reaction gases containing sulfur dioxide into the first stage within a reaction tank for said step of increasing the dew point.

14. The process according to claim 13 wherein said step of burning the pumpable sludge under reducing conditions includes maintaining a temperature within the combustion chamber between 800° C. and 1000° C.

15. The process according to claim 13 wherein said step of separating the bottom product includes obtaining a clear liquid and wherein said step of treating said combustion products with an aqueous liquid includes feeding said clear liquid into the immersion chamber.

16. The process according to claim 13 including the further step of using ammonia obtained by said step of using milk of lime to strip ammonia for said step of treating the cooled gases with a mist of an ammonia mixture.

17. The process according to claim 13 including the further steps of withdrawing reaction liquid from said immersion chamber and feeding said reaction liquid into the top of said stripper column.

* * * * *